US012515903B2

(12) United States Patent
Kawabata et al.

(10) Patent No.: US 12,515,903 B2
(45) Date of Patent: Jan. 6, 2026

(54) MEDIA CONVEYING DEVICE AND IMAGE FORMING APPARATUS

(71) Applicants: Yoichi Kawabata, Kanagawa (JP); Hiroaki Miyagawa, Kanagawa (JP)

(72) Inventors: Yoichi Kawabata, Kanagawa (JP); Hiroaki Miyagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 76 days.

(21) Appl. No.: 18/667,070

(22) Filed: May 17, 2024

(65) Prior Publication Data

US 2024/0383705 A1 Nov. 21, 2024

(30) Foreign Application Priority Data

May 18, 2023 (JP) ................................ 2023-082429

(51) Int. Cl.

*B65H 5/38* (2006.01)
*B41J 13/08* (2006.01)
*B65H 29/20* (2006.01)
*B65H 43/08* (2006.01)

(52) U.S. Cl.

CPC ................ *B65H 5/38* (2013.01); *B41J 13/08* (2013.01); *B65H 29/20* (2013.01); *B65H 43/08* (2013.01); *B65H 2403/52* (2013.01); *B65H 2404/40* (2013.01); *B65H 2511/12* (2013.01); *B65H 2553/412* (2013.01)

(58) Field of Classification Search

CPC .......... B65H 5/38; B65H 29/20; B65H 43/00; B65H 43/08; B65H 2403/52; B65H 2404/40; B65H 2404/41; B65H 2404/412; B65H 2404/4121; B65H 2511/12; B65H 2553/412; B41J 13/08

See application file for complete search history.

(56) References Cited

U.S. PATENT DOCUMENTS

| | | | | |
|---|---|---|---|---|
| 5,322,270 A * | 6/1994 | Belanger | B65H 29/40 198/473.1 |
| 8,561,987 B2 * | 10/2013 | Berlingen | B65H 29/245 271/3.22 |

(Continued)

FOREIGN PATENT DOCUMENTS

| | | |
|---|---|---|
| JP | 8-190281 A | 7/1996 |
| JP | 2001-228758 A | 8/2001 |
| JP | 2001-310837 A | 11/2001 |

*Primary Examiner* — Prasad V Gokhale
(74) *Attorney, Agent, or Firm* — IPUSA, PLLC

(57) ABSTRACT

A media conveying device includes: a delivery cylinder to rotate on an inner circumferential surface side of a medium conveyed along a curved conveyance path; a first guide disc to rotate integrally with the delivery cylinder on an inner circumferential surface side of the curved conveyance path, the first guide disc having an arc-shaped guide surface to come into contact with a first peripheral area of the medium in a width direction of the medium; a second guide disc to rotate integrally with the delivery cylinder on the inner circumferential surface side of the curved conveyance path, the second guide disc having an arc-shaped guide surface to come into contact with a second peripheral area of the medium in the width direction of the medium; and a slide mechanism to slide the first guide disc and the second guide disc in the width direction of the medium.

7 Claims, 13 Drawing Sheets

(56) References Cited

U.S. PATENT DOCUMENTS

| | | | | |
|---|---|---|---|---|
| 2002/0135123 | A1* | 9/2002 | Maul | B41F 21/102 271/277 |
| 2020/0039772 | A1 | 2/2020 | Miyagawa | |
| 2021/0229942 | A1 | 7/2021 | Miyagawa | |
| 2021/0237491 | A1 | 8/2021 | Miyagawa | |
| 2021/0237994 | A1 | 8/2021 | Miyagawa | |
| 2021/0237995 | A1 | 8/2021 | Miyagawa | |
| 2022/0161578 | A1 | 5/2022 | Miyagawa | |
| 2023/0002180 | A1 | 1/2023 | Miyagawa | |

* cited by examiner

MEDIA CONVEYING DEVICE AND IMAGE FORMING APPARATUS

CROSS-REFERENCE TO RELATED APPLICATION

This patent application is based on and claims priority pursuant to 35 U.S.C. § 119 (a) to Japanese Patent Application No. 2023-082429, filed on May 18, 2023, in the Japan Patent Office, the entire disclosure of which is hereby incorporated by reference herein.

BACKGROUND

Technical Field

Embodiments of the present disclosure relate to a media conveying device and an image forming apparatus.

Related Art

Some image forming apparatuses include: an image forming unit that forms an image on a sheet (medium); and a conveying unit that conveys the sheet on which the image has been formed by the image forming unit. In such image forming apparatuses, the conveying unit may accidentally come into contact with the image on the sheet, so that the conveying unit may be soiled with ink or fade the image on the sheet.

To solve such a problem, for example, an image forming apparatus has been proposed to include a conveying unit that nips margins of a sheet and conveys the sheet. The conveyor is movable in the main scanning direction in accordance with the size of the sheet.

SUMMARY

According to an embodiment of the present disclosure, a media conveying device includes a delivery cylinder, a first guide disc, a second guide disc, and a slide mechanism. The delivery cylinder rotates on an inner circumferential surface side of a medium conveyed along a curved conveyance path. The first guide disc rotates integrally with the delivery cylinder on an inner circumferential surface side of the curved conveyance path. The first guide disc has an arc-shaped guide surface to come into contact with a first peripheral area of the medium in a width direction of the medium. The second guide disc rotates integrally with the delivery cylinder on the inner circumferential surface side of the curved conveyance path. The second guide disc has an arc-shaped guide surface to come into contact with a second peripheral area of the medium in the width direction of the medium. A slide mechanism slides the first guide disc and the second guide disc in the width direction of the medium.

According to an embodiment of the present disclosure, an image forming apparatus includes an image forming device to form an image on a medium and the media conveying device to convey the medium on which the image has been formed by the image forming device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
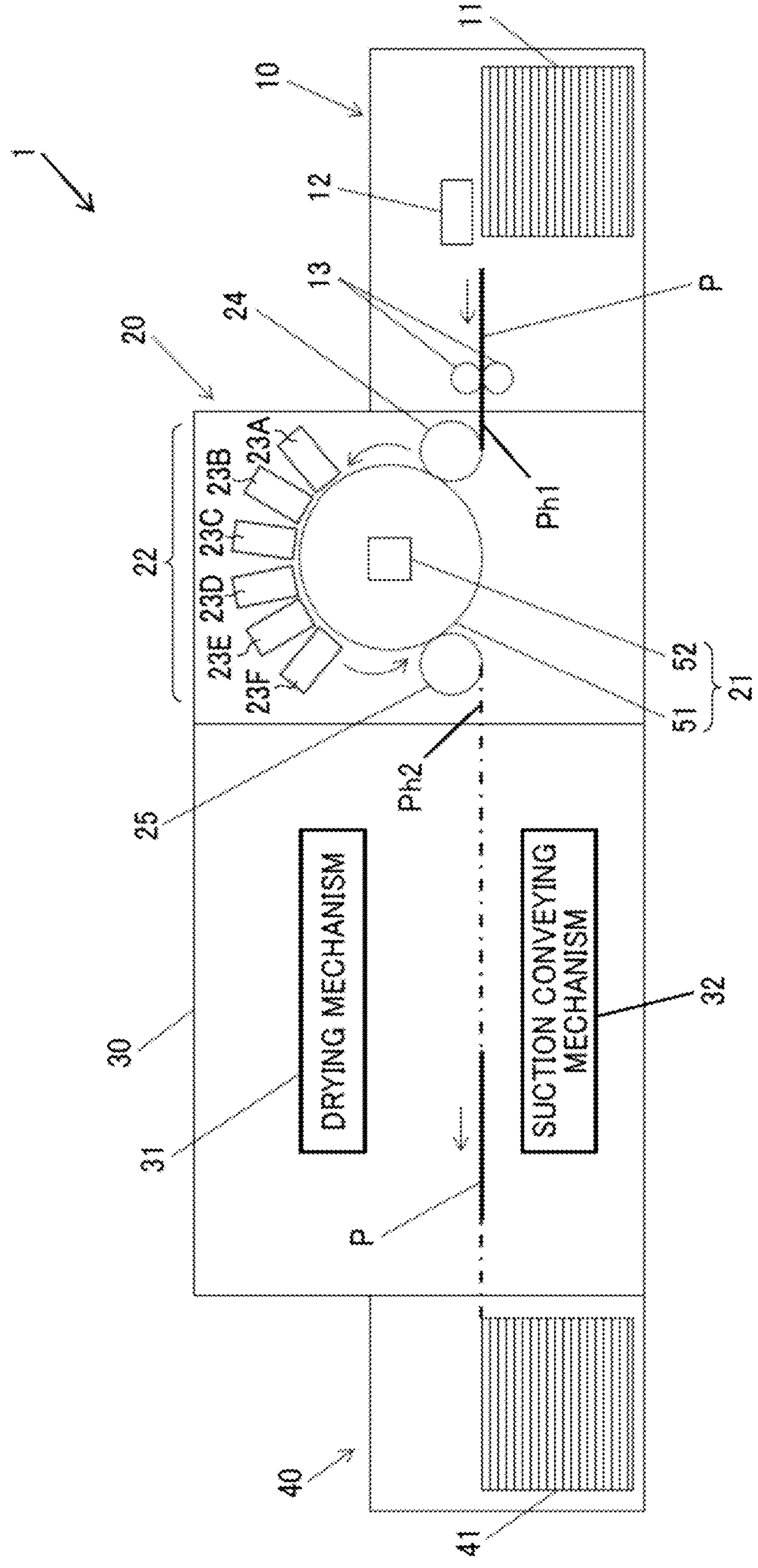
FIG. 1 is a schematic configuration diagram of an inkjet recording apparatus, which is an example of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure will be described below with reference to the drawings. FIG. 1 is a schematic configuration diagram of an inkjet recording apparatus 1, which is an example of an image forming apparatus.

As illustrated in FIG. 1, the inkjet recording apparatus 1 includes a loading unit 10, an image forming unit 20, a drying unit 30, and an ejection unit 40. The inkjet recording apparatus 1 causes the image forming unit 20 to discharge ink onto a paper sheet P (medium) loaded from the loading unit 10, thereby forming an image on the paper sheet P. Subsequently, the inkjet recording apparatus 1 causes the drying unit 30 to dry the ink on the paper sheet P and then ejects the paper sheet P to the ejection unit 40.

The inkjet recording apparatus 1 has inside an upstream conveyance path Ph1 and a downstream conveyance path Ph2. Each of the upstream conveyance path Ph1 and the downstream conveyance path Ph2 corresponds to an inner space of the inkjet recording apparatus 1 through which the paper sheet P passes. The upstream conveyance path Ph1 is a conveyance path on an upstream side of the image forming unit 20 in a conveyance direction of the paper sheet P (i.e., a conveyance path from the loading unit 10 to the image forming unit 20). The downstream conveyance path Ph2 is a conveyance path on a downstream side of the image forming unit 20 in the conveyance direction of the paper sheet P (i.e., a conveyance path from the image forming unit 20 to the ejection unit 40 via the drying unit 30).

The conveyance direction of the paper sheet P refers to a direction from the loading unit 10 to the ejection unit 40 along the upstream conveyance path Ph1 and the downstream conveyance path Ph2 via the image forming unit 20 and the drying unit 30. Furthermore, each of the upstream conveyance path Ph1 and the downstream conveyance path Ph2 may extend linearly or be curved in the conveyance direction of the paper sheet P or may extend linearly and be curved in the conveyance direction. Further, a portion of the downstream conveyance path Ph2 which extends along the outer circumferential surface of the delivery cylinder 25 from the location between a drum 51 and a delivery cylinder 25 (described later) corresponds to a conveyance path curved in the conveyance direction, or a curved conveyance path.

The loading unit 10 includes a loading tray 11 on which a plurality of paper sheets P is stacked, a feeding device 12 that separately feeds the paper sheets P from the loading tray 11, and a registration roller pair 13 that feeds the paper sheet P to the image forming unit 20 along the upstream conveyance path Ph1. The feeding device 12 may be any known feeding device, such as a device with a roller or any other rolling element or an air-suction device.

When a paper sheet P is fed from the loading tray 11 along the upstream conveyance path Ph1 by the feeding device 12, the leading edge of the paper sheet P reaches the registration roller pair 13. The paper sheet P is then loaded into the image forming unit 20 by the registration roller pair 13 driving at a predetermined timing. Note that the present embodiment is not intended to limit the configuration of the loading unit 10; the loading unit 10 may have any other functions in addition to feeding paper sheets P to the image forming unit 20.

The image forming unit 20, which is an example of an image forming device, forms an image on the paper sheet P that has been fed by the loading unit 10 and then ejects, to the drying unit 30, the paper sheet P on which the image has been formed. The image forming unit 20 includes a sheet conveying device 21 that conveys the paper sheet P, a liquid discharge unit 22 that discharges liquid onto the paper sheet P conveyed by the sheet conveying device 21, a receiving cylinder 24, and the delivery cylinder 25 (media conveying device).

The sheet conveying device 21 includes: the drum 51 that supports the paper sheet P on the circumferential surface and simultaneously rotates; and a suction device 52 that serves as a suction unit that generates a suction force on the circumferential surface of the drum 51. The receiving cylinder 24 receives the paper sheet P from the loading unit 10 and then delivers the paper sheet P to the drum 51. The delivery cylinder 25 receives, from the drum 51, the paper sheet P on which the image has been formed and then delivers the paper sheet P to the drying unit 30.

When the paper sheet P is conveyed from the loading unit 10 to the image forming unit 20, the leading edge of the paper sheet P is gripped by a gripper provided on the surface of the receiving cylinder 24. The paper sheet P is then conveyed along with the surface movement of the receiving cylinder 24. The paper sheet P conveyed by the receiving cylinder 24 is delivered to the drum 51 at a location where the receiving cylinder 24 faces the drum 51.

The surface of the drum 51 is also provided with a gripper, which grips the leading edge of the paper sheet P. In addition, the surface of the drum 51 is provided with a plurality of suction holes dispersedly formed. The suction device 52 generates an airflow toward the interior of the drum 51 inside the suction holes. With this airflow, the paper sheet P is electrostatically attracted onto the surface of the drum 51. When the paper sheet P is delivered from the receiving cylinder 24 to the drum 51, the leading edge of the paper sheet P is gripped by the gripper of the drum 51 and electrostatically attracted onto the surface of the drum 51 with the suction airflow. The paper sheet P is thereby conveyed along with the surface movement of the drum 51.

The liquid discharge unit 22 includes a plurality of discharge units 23 (23A to 23F) as liquid dischargers. For example, the discharge unit 23A discharges a cyan (C) liquid; the discharge unit 23B discharges a magenta (M) liquid; the discharge unit 23C discharges a yellow (Y) liquid; and the discharge unit 23D discharges a black (K) liquid. Each of the discharge units 23E and 23F is used to discharge one of Y, M, C, and K liquids or a special liquid such as a white, gold, or silver liquid. Optionally, the liquid discharge unit 22 may include a discharge unit that discharges a treatment liquid, such as a surface-coating liquid.

Each of the discharge units 23A to 23F is, for example, a full-line head in which the plurality of liquid discharge units (simply referred to below as heads) is mounted on a base member, each head having an array of a plurality of nozzles. The discharge operations of the discharge units 23A to 23F are controlled with a drive signal generated based on image data. When the paper sheet P conveyed by the drum 51 passes through the region facing the liquid discharge unit 22, the discharge units 23A to 23F discharge the respective color inks through the nozzles provided on the lower surfaces (nozzle surfaces). In this way, an image is formed on the paper sheet P in accordance with the image data.

Note that the present embodiment is not intended to limit the configuration of the image forming unit 20 in which the liquids are discharged or attached onto the paper sheet P; the image forming unit 20 may have any other functions in addition to attaching a liquid onto the paper sheet P to form an image on the paper sheet P.

Figure 5:
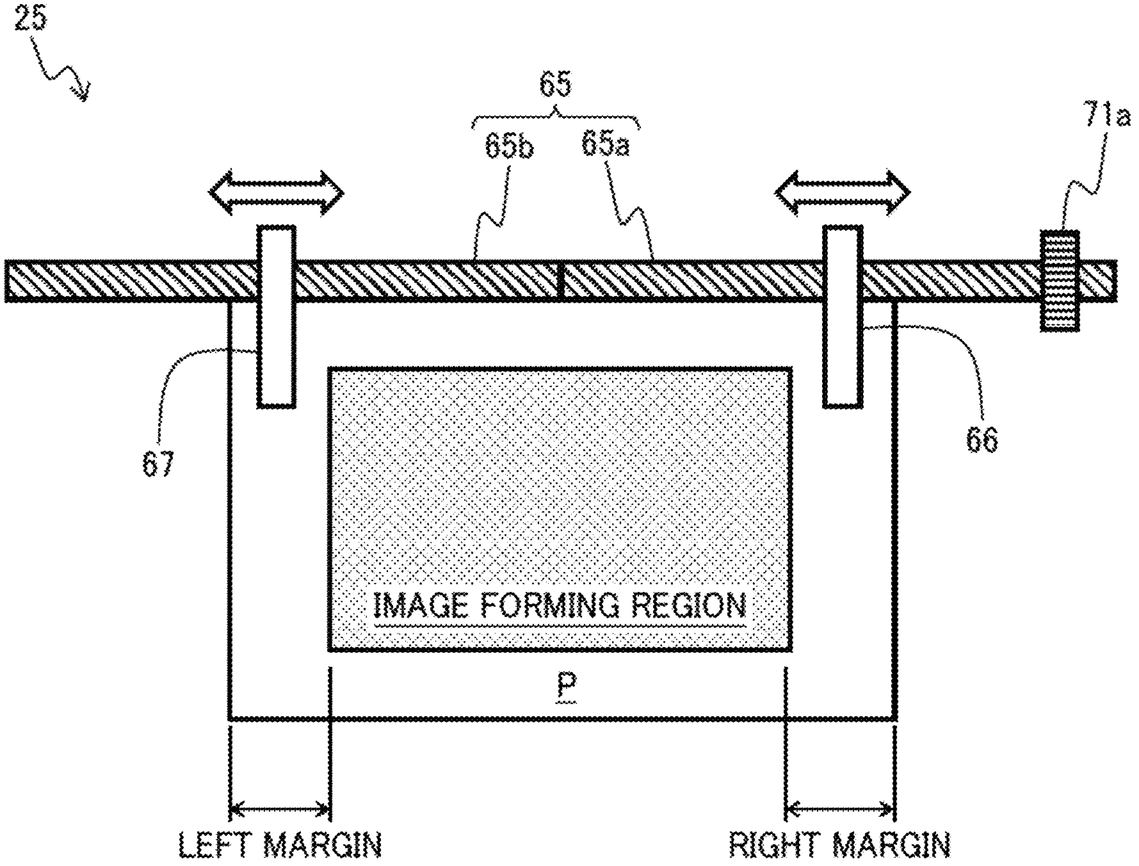
FIG. 5 is a cross-sectional view of a main part of the delivery cylinder.

The image forming unit 20 according to the present embodiment can form an image in an image forming region (see FIG. 5) on the paper sheet P at the center. Thus, after an image has been formed on the paper sheet P by the image forming unit 20, two margins in which the image is not formed are reserved in both peripheral areas of the paper sheet P in a width direction. In this case, the width direction of the paper sheet P refers to a direction orthogonal to both the conveyance direction of the paper sheet P and the thickness direction of the paper sheet P. Referring to FIG. 5, the two margins, or a right margin and a left margin, are positioned on opposite sides of the paper sheet P in the width direction across the image forming region. Each of the right margin and the left margin has a predetermined length in the width direction of the paper sheet P. Furthermore, the right margin and the left margin are provided in the entire area of the paper sheet P in the conveyance direction of the paper sheet P.

The paper sheet P that has been conveyed by the drum 51, namely, the paper sheet P on which the image has been formed by the image forming unit 20 is delivered to the delivery cylinder 25 at a location where the drum 51 faces the delivery cylinder 25. More specifically, the leading edge of the paper sheet P is gripped by the gripper provided on the surface of the delivery cylinder 25. The paper sheet P is then conveyed along with the surface movement of the delivery cylinder 25. In this case, the surface of the paper sheet P on which an image has been formed (i.e., the inner circumferential surface of the paper sheet P conveyed along the curved conveyance path) faces the delivery cylinder 25. The paper sheet P conveyed by the delivery cylinder 25 is delivered to the drying unit 30 along the downstream conveyance path Ph2. Details of the configuration of the delivery cylinder 25 will be described later with reference to FIGS. 2 to 11.

The drying unit 30 includes a drying mechanism 31 and a suction conveying mechanism 32. The drying mechanism 31 dries the ink that has been attached onto the paper sheet P by the image forming unit 20. The suction conveying mechanism 32 conveys the paper sheet P delivered from the delivery cylinder 25 to the ejection unit 40 along the downstream conveyance path Ph2. More specifically, when the paper sheet P conveyed from the image forming unit 20 to the drying mechanism 31 through the delivery cylinder 25, the paper sheet P is received by the suction conveying mechanism 32. The paper sheet P is then conveyed by the suction conveying mechanism 32 to pass through the drying mechanism 31. In this way, the paper sheet P is delivered to the ejection unit 40. When the paper sheet P passes through the drying mechanism 31, the ink on the paper sheet P is subjected to a drying process by which liquid components such as moisture in the ink are evaporated. As a result, the ink adheres to the paper sheet P, and curling of the paper sheet P is suppressed.

The ejection unit 40 includes an ejection tray 41 on which a plurality of paper sheets P is stacked. The paper sheets P conveyed from the drying unit 30 by the suction conveying mechanism 32 are sequentially stacked and stored on the ejection tray 41. Note that the present embodiment is not intended to limit the configuration of the ejection unit 40; the ejection unit 40 may have any other function in addition to ejecting the paper sheet P.

The inkjet recording apparatus 1 according to the present embodiment includes the loading unit 10, the image forming unit 20, the drying unit 30, and the ejection unit 40; however, the inkjet recording apparatus 1 may further include any other functional unit as appropriate. For example, the inkjet recording apparatus 1 may include a pre-processing unit that performs a pre-process for the image formation between the loading unit 10 and the image forming unit 20 or may include a post-processing unit that performs a post-process for the image formation between the drying unit 30 and the ejection unit 40.

Examples of the pre-processing unit include a unit that applies a treatment liquid that reacts with the ink on the paper sheet P in order to suppress smearing of the ink. However, the configuration of the pre-processing unit is not limited to this example. Examples of the post-processing unit include: a unit that turns over the paper sheet P on which the image has been formed by the image forming unit 20, returns the paper sheet P to the image forming unit 20, and forms another image on the other surface of the paper sheet P; and a unit that binds together a plurality of paper sheets P on which images have been formed. However, the configuration of the post-processing unit is not limited to this example.

In the present embodiment, the inkjet recording apparatus 1 is described as an example of the image forming apparatus. However, the image forming apparatus is not limited to one that discharges liquid droplets to visualize a significant image such as a character or a figure; the image forming apparatus may include any other unit in addition to a liquid droplet discharge unit that discharges liquid onto a surface to be dried of a sheet material. As another example, the image forming apparatus may form a line or a pattern that has no meaning in itself.

A material of media is not limited to a specific one; the media may be made of any material, such as paper, thread, fiber, cloth, leather, metal, plastic, glass, wood, and ceramics, to which liquid can at least temporarily adhere. Examples of the media may include a film product, a cloth product to be used for clothing, a building material such as wallpaper or a floor material, and a leather product. In the present embodiment, an object to which liquid can at least temporarily adhere is defined as media. A specific example of a liquid droplet is not limited to an ink droplet to be discharged from the liquid discharge unit 22 and may be a treatment liquid droplet to be used in the pre-processing unit. Therefore, the present disclosure is widely applicable to liquid droplet discharge devices that place liquid droplets at target locations.

The discharge head refers to a functional component that discharges or jets liquid through discharge holes (nozzles). An energy generation source used for discharging liquid may be a discharge energy generation unit; examples of such a discharge energy generation unit include a piezoelectric actuator, a thermal actuator with an electrothermal conversion element such as a heating resistor, and an electrostatic actuator with a diaphragm and counter electrodes. However, the discharge energy generation unit used is not limited to those examples.

Figure 2:
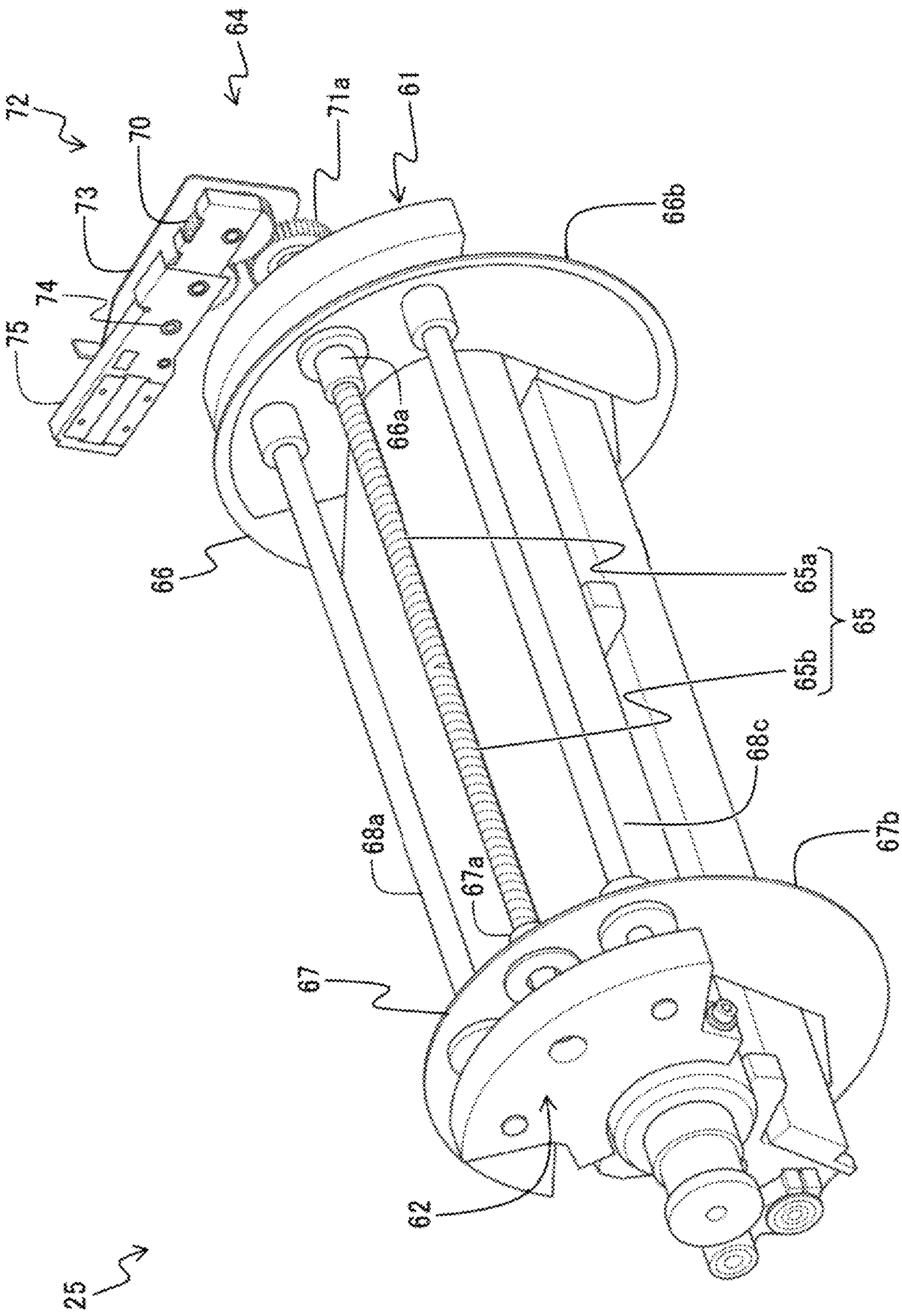
FIG. 2 is a perspective view of a delivery cylinder, which is an example of a media conveying device.
Figure 3:
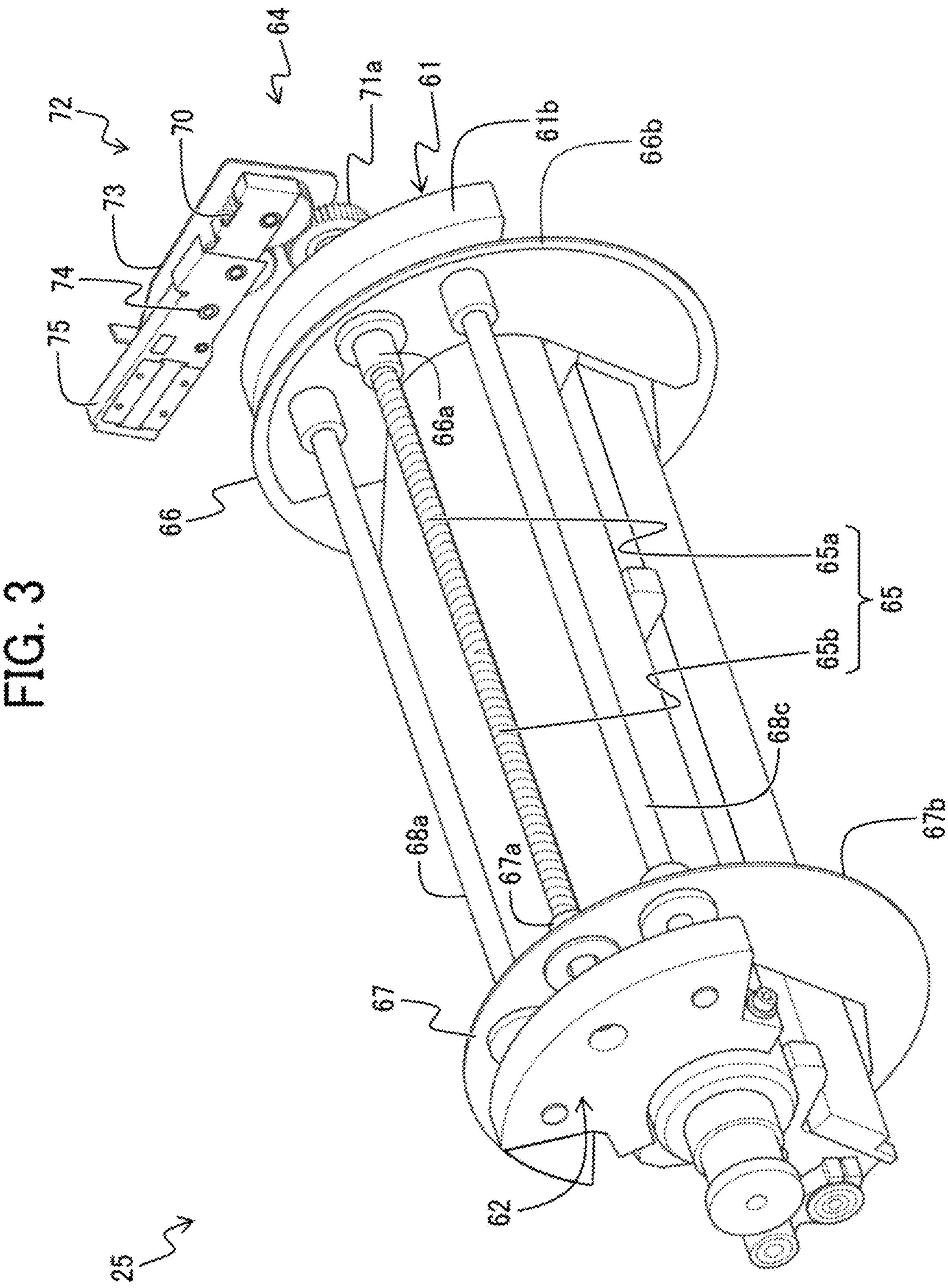
FIG. 3 is a perspective view of the delivery cylinder in which a pair of guide discs are disposed apart from each other.
Figure 4:
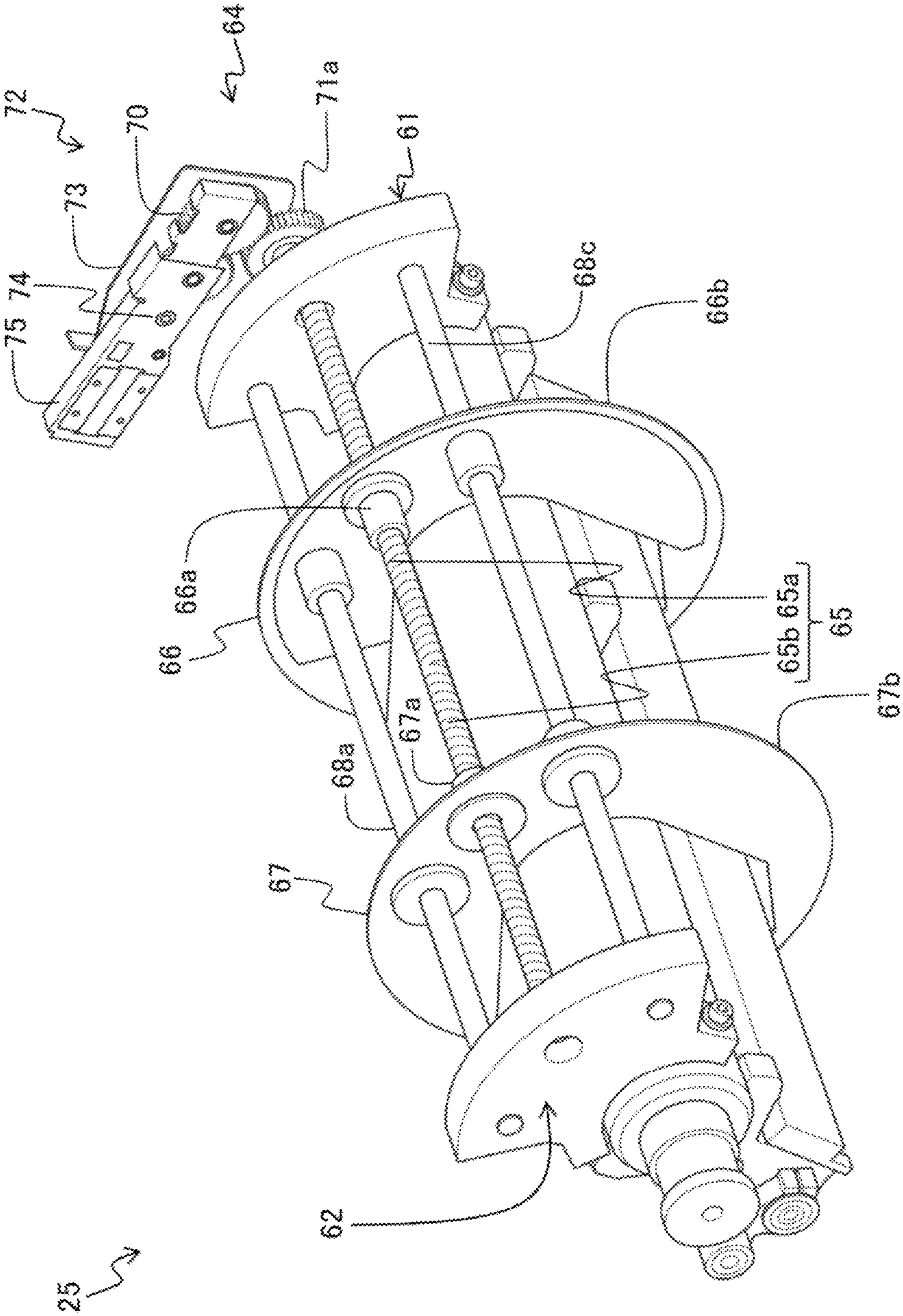
FIG. 4 is a perspective view of the delivery cylinder in which the pair of guide discs are disposed close to each other.

FIG. 2 is a perspective view of the delivery cylinder 25, which is an example of the media conveying device. FIG. 3 is a perspective view of the delivery cylinder 25 in which a pair of guide discs 66 and 67 are disposed apart from each other. FIG. 4 is a perspective view of the delivery cylinder 25 in which the pair of guide discs 66 and 67 are disposed close to each other. FIG. 5 is a cross-sectional view of a main part of the delivery cylinder 25.

The delivery cylinder 25 is disposed on an inner circumferential surface side of the curved conveyance path, which is a portion of the downstream conveyance path Ph2. In addition, the delivery cylinder 25 comes into contact with only a margin outside the image forming region in the inner circumferential surface of the paper sheet P (i.e., the surface of the paper sheet P on which the image has been formed by the image forming unit 20) fed along the curved conveyance path and conveys the paper sheet P in the conveyance direction. As illustrated in FIGS. 2 to 5, the delivery cylinder 25 includes the guide disc 66 (first guide disc), the guide disc 67 (second guide disc), a rotation motor 63 (see FIG. 12), and a slide mechanism 64.

As illustrated in FIGS. 3 and 4, each of the guide discs 66 and 67 has a substantially fan-shaped outer shape. In addition, each of the guide discs 66 and 67 has a plate shape having a predetermined thickness. The guide discs 66 and 67 are configured to be slidable in the axial direction of the delivery cylinder 25 on the delivery cylinder 25. In addition, the guide discs 66 and 67 have female screws 66*a* and 67*a*, respectively, screwed into the screw shaft 65 (described later) at a location corresponding to the central angle of the fan shape. Furthermore, the guide discs 66 and 67 are rotatable integrally with the delivery cylinder 25 around the female screws 66*a* and 67*a*, respectively.

The arc-shaped outer circumferential surfaces of the guide discs 66 and 67 function as guide surfaces 66*b* and 67*b*, respectively, that come into contact with the respective margins on the inner circumferential surface side of the paper sheet P and guide the conveyance of the paper sheet P. The guide discs 66 and 67 are disposed in the delivery cylinder 25 so as to surround the body of the delivery cylinder 25 (i.e., a cylindrical member located at the center of the delivery cylinder 25). The guide discs 66 and 67 slides as a single unit and rotates as a single unit.

The rotation motor 63 generates a driving force by which the delivery cylinder 25 is rotated. As the driving force of the rotation motor 63 is transmitted to the delivery cylinder 25, the delivery cylinder 25 is rotated. In the delivery cylinder 25, support portions 61 and 62, the screw shaft 65, the guide discs 66 and 67, and the guide shafts 68*a* and 68*c* rotate integrally. The rotation motor 63 may be omitted, and the drum 51 and the delivery cylinder 25 may be rotated in synchronization with each other by a motor that rotates the drum 51.

The slide mechanism 64 causes the guide discs 66 and 67 to slide in the width directions of the paper sheet P. More specifically, the slide mechanism 64 causes the guide discs 66 and 67 to slide in relation to each other so as to move close to and away from each other. As illustrated in FIGS. 2 to 5, the slide mechanism 64 includes the screw shaft 65, the guide discs 66 and 67, guide shafts 68*a* and 68*c* (hereinafter, may be collectively referred to as the guide shafts 68), a slide motor 69 (see FIG. 12), the drive gear 70, driven gears 71, and an adjuster 72.

The screw shaft 65 extends along the width direction of the paper sheet P in the delivery cylinder 25. The screw shaft 65 includes a first section 65*a* on a first side of the paper sheet P in the width direction and a second section 65*b* on a second side of the paper sheet P in the width direction. The first section 65*a* has, on the outer circumferential surface, a male screw into which the female screw 66*a* of the guide disc 66 is screwed. Likewise, the second section 65*b* has, on the outer circumferential surface, a male screw into which the female screw 67*a* of the guide disc 67 is screwed. The male screws in the first section 65*a* and the second section 65*b* are formed in thread directions (or the directions of the spirals constituting the screws) opposite to each other.

The first section 65*a* and the second section 65*b* are disposed adjacent to each other in the extending direction of the screw shaft 65. In this case, the joint between the first section 65*a* and the second section 65*b* faces the center, in the width direction, of the paper sheet P being conveyed along the downstream conveyance path Ph2, regardless of the size of the paper sheet P. In addition, the guide discs 66 and 67 are regularly positioned symmetrically in the width direction of the paper sheet P with respect to the joint between the first section 65*a* and the second section 65*b*. In short, the guide discs 66 and 67 are positioned symmetrically in the width direction of the paper sheet P with respect to the center, in the width direction, of the paper sheet P being conveyed along the downstream conveyance path Ph2, regardless of the size of the paper sheet P.

Each guide shaft 68 extends in parallel with the screw shaft 65 in the delivery cylinder 25. The guide shafts 68*a* and 68*c* are disposed apart from one another in the circumferential direction of the guide shaft 68. The guide shaft 68 enters through holes of the guide discs 66 and 67, thus guiding the guide discs 66 and 67 that slide in the width direction of the paper sheet P. Both ends of the screw shaft 65 and the guide shaft 68 are supported by the support portions 61 and 62.

The slide motor 69 generates a driving force by which both guide discs 66 and 67 are slid. The drive gear 70 rotates with the rotation of the slide motor 69. Each driven gear 71 rotates integrally with the screw shaft 65. The adjuster 72 causes the drive gear 70 and the driven gears 71 to engage with or disengage from one another. More specifically, the adjuster 72 switches between a state in which the drive gear 70 disengages from the one of the driven gears 71 (see FIG. 6) and a state in which the drive gear 70 engages with the one of the driven gears 71 (see FIG. 7).

When the drive gear 70 disengages from the driven gear 71, the transmission of the driving force of the slide motor 69 to the screw shaft 65 stops. When the drive gear 70 engages with the driven gear 71, the driving force of the slide motor 69 starts to be transmitted to the screw shaft 65 through the drive gear 70 and the driven gears 71. With the rotation of the screw shaft 65, the guide discs 66 and 67 slide close to or away from one another in the width direction of the paper sheet P.

More specifically, the guide shafts 68*a* and 68*c* are inserted through the corresponding through-holes of the guide discs 66 and 67. Therefore, the guide discs 66 and 67 do not rotate together with the screw shaft 65 but slide in the extending directions of the screw shaft 65 along the male screw of the screw shaft 65. In this case, both the screw shaft 65 and the guide shafts 68*a* and 68*c* constitute a feed screw mechanism.

The first section 65*a* and the second section 65*b* have male screws formed in opposite thread directions. Therefore, the pair of the guide discs 66 and 67 slide in directions opposite to each other. More specifically, the rotation of the screw shaft 65 in a first direction causes the pair of the guide discs 66 and 67 to move close to each other along the guide shafts 68*a* and 68*c*. The rotation of the screw shaft 65 in a second direction, the second direction being opposite to the first direction, causes the pair of the guide discs 66 and 67 to move away from each other along the guide shafts 68*a* and 68*c*.

Figure 6:
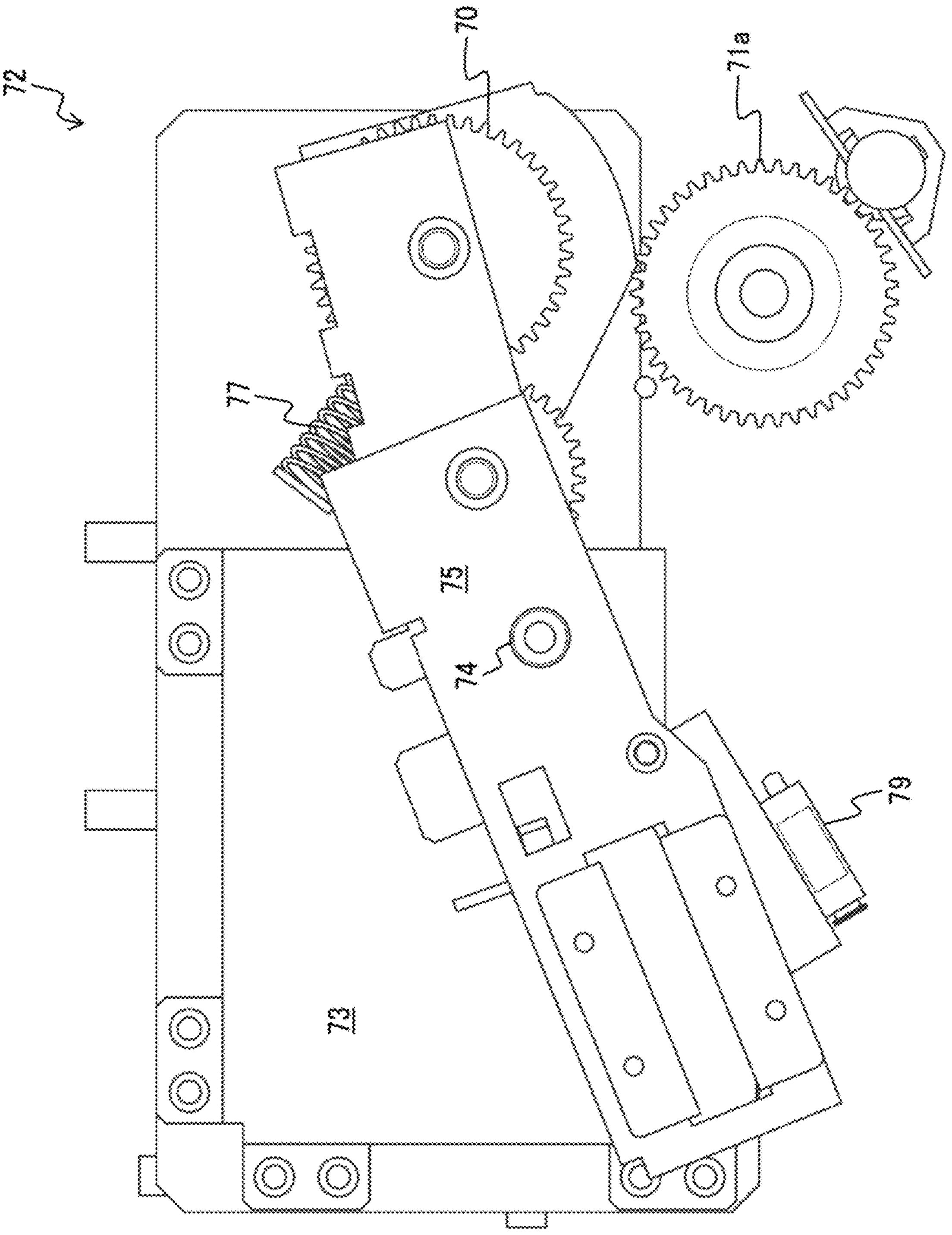
FIG. 6 is a front view of an adjuster in which a drive gear disengages from a driven gear.
Figure 7:
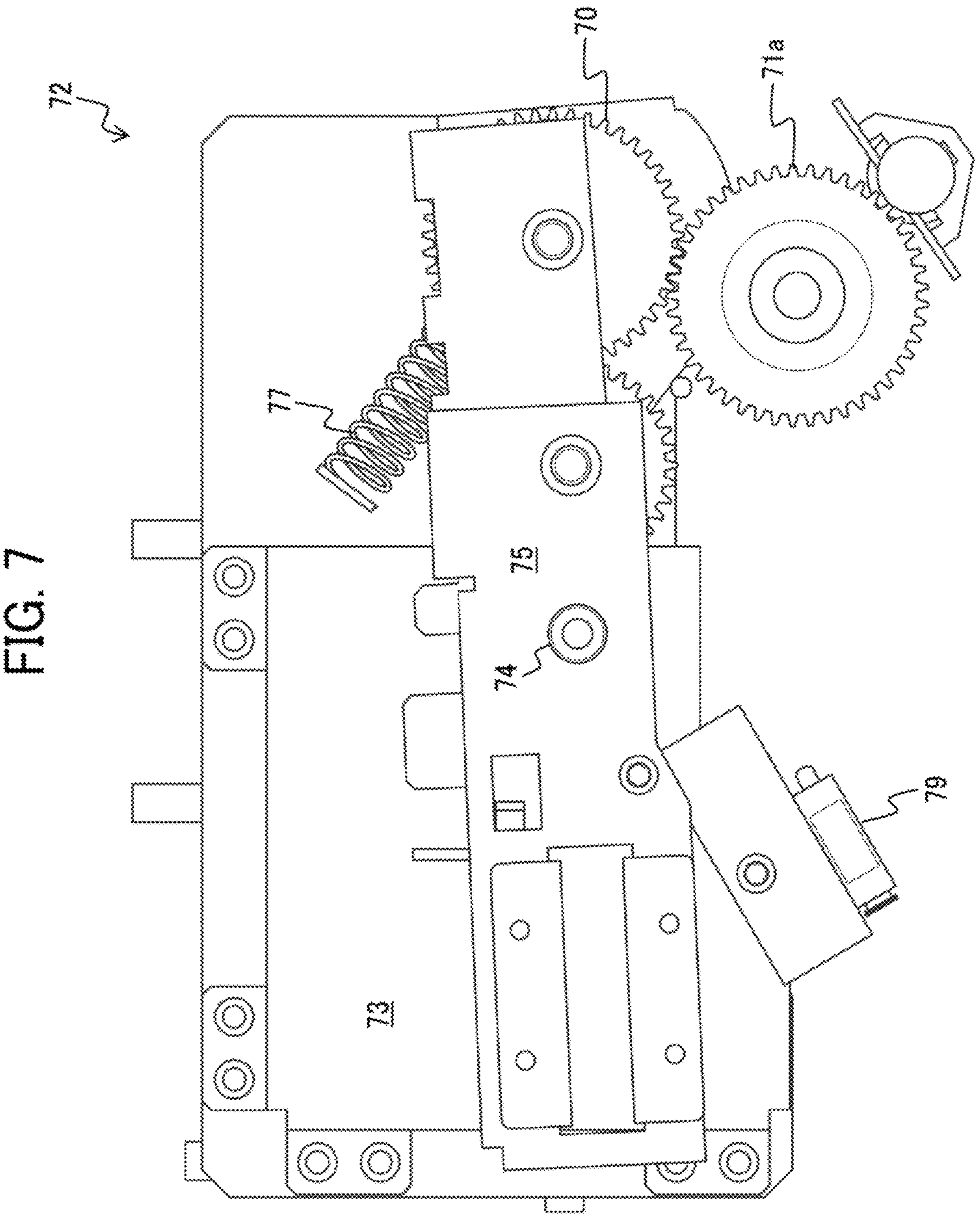
FIG. 7 is a front view of the adjuster in which the drive gear engages with the driven gear.
Figure 8:
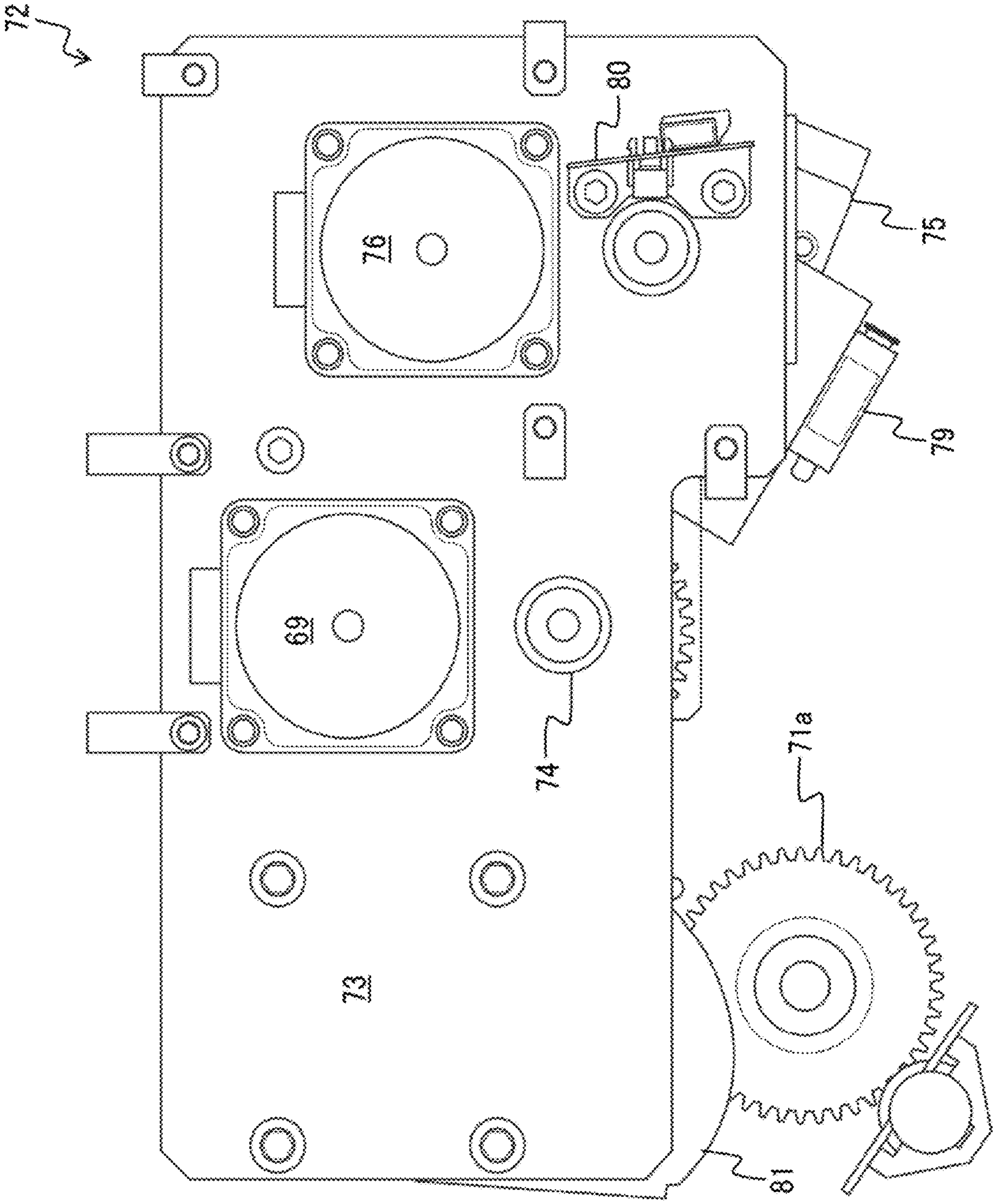
FIG. 8 is a rear view of the adjuster.

FIG. 6 is a front view of the adjuster 72 in which the drive gear 70 disengages from the driven gear 71. FIG. 7 is a front view of the adjuster 72 in which the drive gear 70 engages with the driven gear 71. FIG. 8 is a rear view of the adjuster 72. As illustrated in FIGS. 2 to 4, the adjuster 72 is disposed outside the region through which the paper sheet P passes, in the width direction of the paper sheet P. As illustrated in FIGS. 6 to 8, the adjuster 72 includes a base plate 73, a swing shaft 74, a swing arm 75, a swing motor 76, and a coil spring 77 (biasing member).

The base plate 73 is a planar member fixed to the frame of the inkjet recording apparatus 1. The base plate 73 supports the slide motor 69, the swing shaft 74, the swing arm 75, the swing motor 76, and the coil spring 77. More specifically, as illustrated in FIGS. 6 and 7, the swing shaft 74, the swing arm 75, and the coil spring 77 are all fixed to the surface of the base plate 73. As illustrated in FIG. 8, both the slide motor 69 and the swing motor 76 are fixed to the back surface of the base plate 73.

The swing shaft 74 extends in parallel with the screw shaft 65. The swing arm 75 is supported by the swing shaft 74 so as to be swingable around a swing shaft 74. The swing arm 75 rotatably supports the drive gear 70. The swing motor 76 generates a driving force by which the swing arm 75 is swung. The swing arm 75 receives the driving force of the swing motor 76, thereby swinging between a disengaging location (see FIG. 6) at which the drive gear 70 disengages from the driven gear 71 and an engaging location (see FIG. 7) at which the drive gear 70 engages with the driven gear 71. The coil spring 77 has a first end coupled to the base plate 73 and a second end coupled to the swing arm 75.

Figure 12:
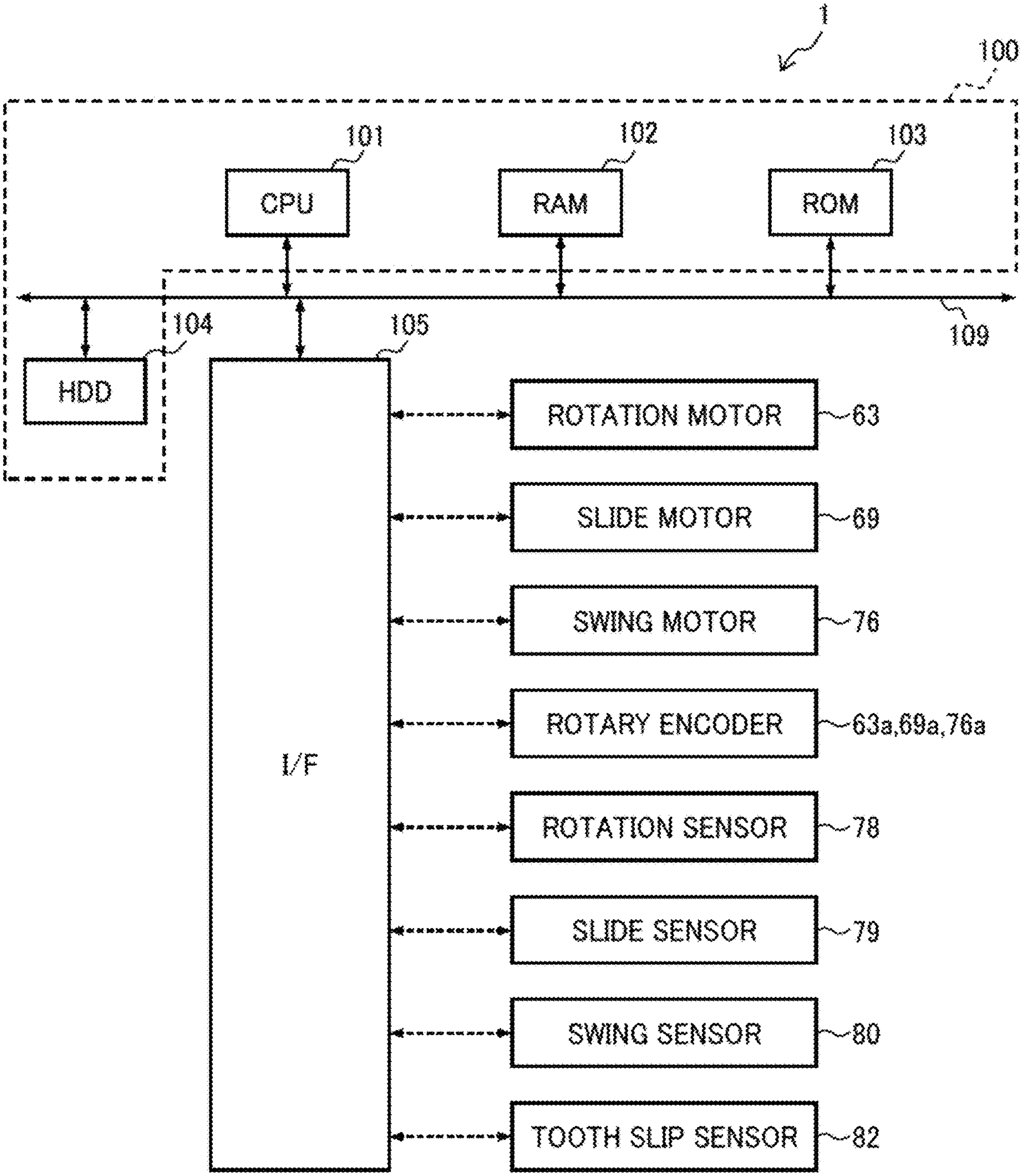
FIG. 12 is a hardware configuration diagram for a control process to be performed by the inkjet recording apparatus.

The delivery cylinder 25 includes a rotation sensor 78 (see FIG. 12). The rotation sensor 78 detects a location of the guide disc 66 on the circumference of the delivery cylinder 25 and then outputs a detection signal to the controller 100 (see FIG. 12). More specifically, when the guide disc 66 is disposed at an initial location, which refers to a location at which the drum 51 faces the delivery cylinder 25, the rotation sensor 78 outputs the detection signal. When the guide disc 66 is disposed at a location other than the initial location, the rotation sensor 78 does not output the detection signal.

The rotation sensor 78 is, for example, a reflective optical sensor. The rotation sensor 78 outputs light toward the guide disc 66. When the guide disc 66 is disposed at the initial location, the rotation sensor 78 receives the light reflected by the guide disc 66 and outputs a detection signal accordingly. When the guide disc 66 is displaced away from the initial location, the light is no longer reflected by the guide disc 66. In response, the rotation sensor 78 stops outputting the detection signal. However, the specific configuration of the rotation sensor 78 is not limited to this example.

The delivery cylinder 25 also includes a slide sensor 79 (see FIG. 12). The slide sensor 79 detects a location of the guide disc 66 in the width direction of the paper sheet P and then outputs a detection signal to the controller 100. More specifically, when the guide disc 66 is disposed at an outermost, origin location (i.e., a location farthest from the guide disc 67), the slide sensor 79 outputs the detection signal. When the guide disc 66 is disposed at a location other than the origin location, the slide sensor 79 does not output the detection signal.

The slide sensor 79 is, for example, a reflective optical sensor. Then, slide sensor 79 outputs light toward the guide disc 66. When the guide disc 66 is disposed at the origin location, the slide sensor 79 receives light reflected by the guide disc 66 and outputs the detection signal accordingly. When the guide disc 66 is displaced away from the origin location, the light is no longer reflected by the guide disc 66. Thus, the slide sensor 79 stops outputting the detection signal. However, the specific configuration of the slide sensor 79 is not limited to this example.

The delivery cylinder 25 includes a swing sensor 80 (see FIG. 12). The swing sensor 80 detects a location of the swing arm 75 and then outputs a detection signal to the controller 100. More specifically, when the swing arm 75 is disposed at the engaging location, the swing sensor 80 outputs the detection signal. When the swing arm 75 is disposed at a location other than the engaging location, the swing sensor 80 does not output the detection signal.

The swing sensor 80 is, for example, a reflective optical sensor. The swing sensor 80 outputs light toward the swing arm 75. When the swing arm 75 is disposed at the engaging location, the swing sensor 80 receives the light reflected by the swing arm 75. In response, the swing sensor 80 outputs a detection signal. When the swing arm 75 is displaced from the engaging location, the light is no longer reflected by the swing arm 75. Thus, the swing sensor 80 stops outputting the detection signal. However, the specific configuration of the swing sensor 80 is not limited to this example.

Figure 9:
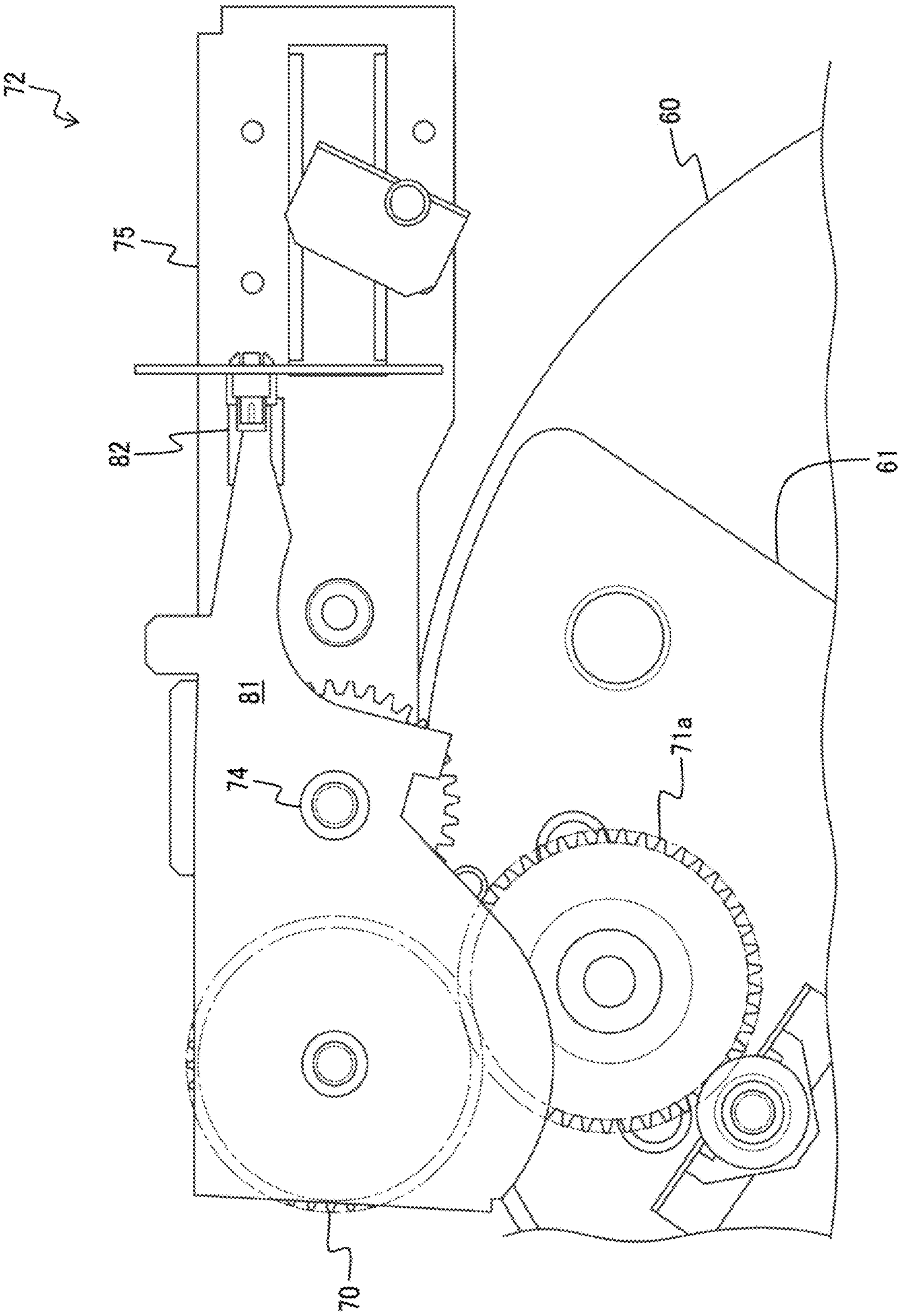
FIG. 9 illustrates a feeler and a tooth slip sensor.
Figure 10:
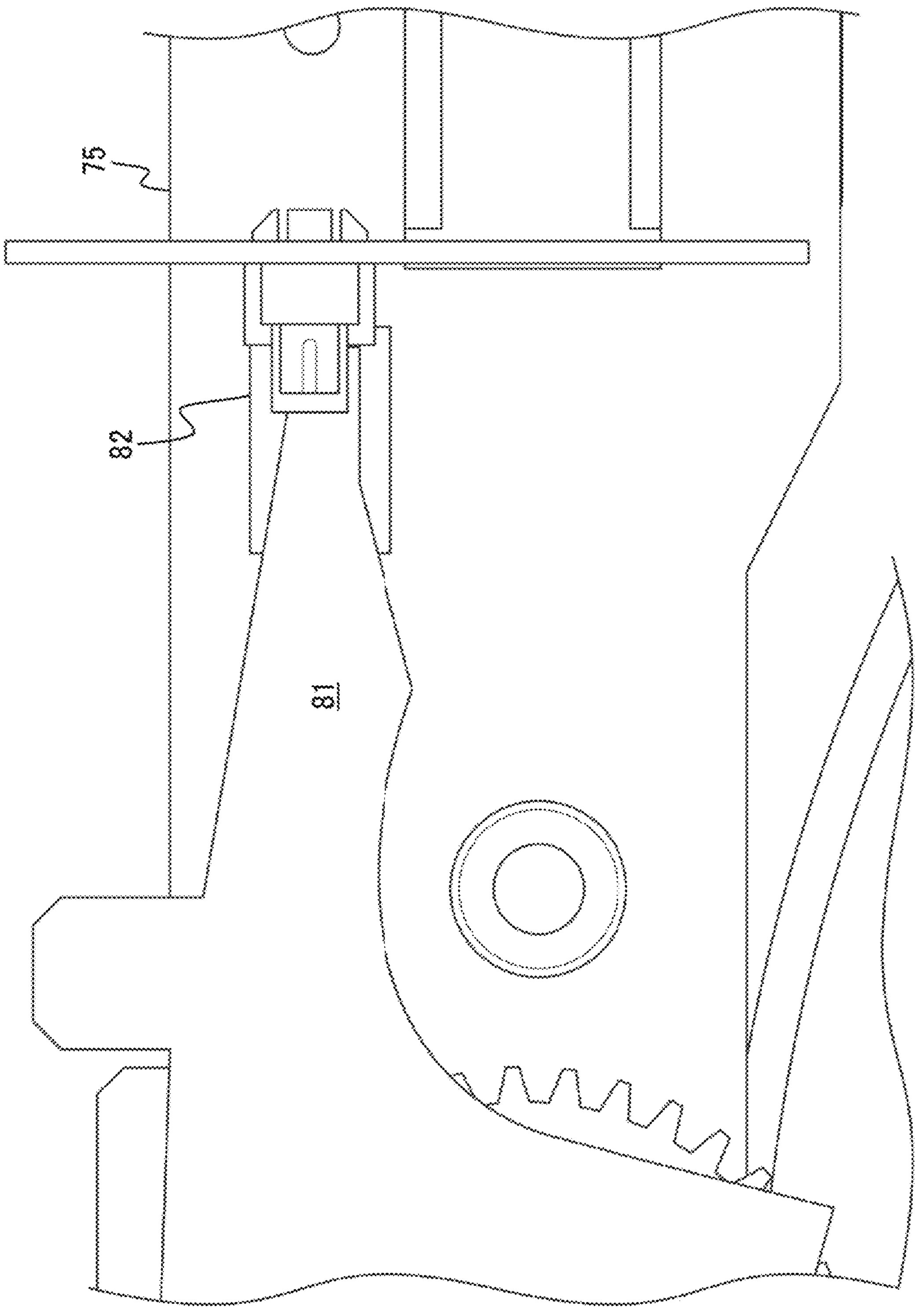
FIG. 10 illustrates a state in which the feeler blocks an optical path of the tooth slip sensor.
Figure 11:
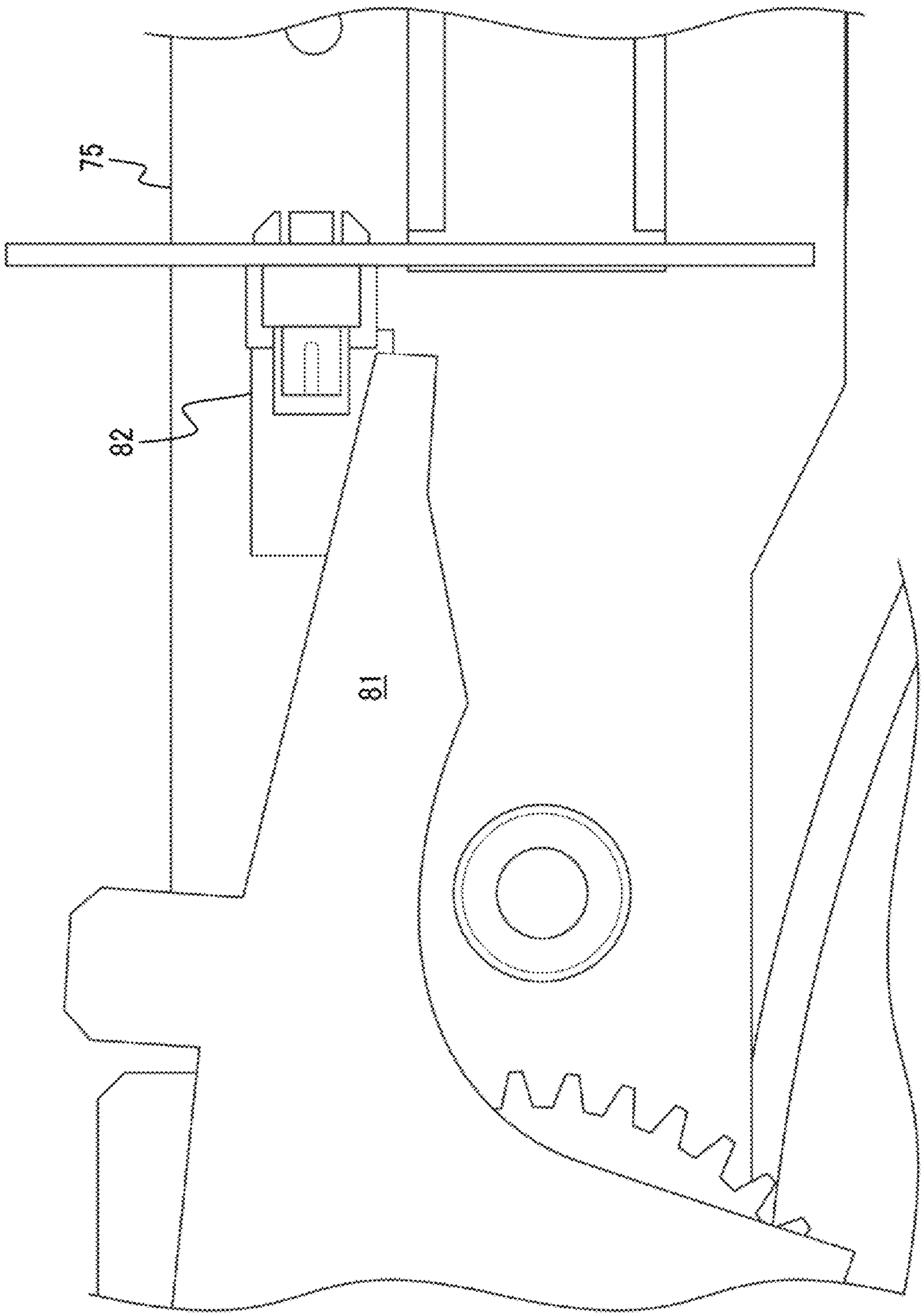
FIG. 11 illustrates a state in which the feeler is displaced away from an optical path of the tooth slip sensor.

FIG. 9 illustrates a feeler 81 and a tooth slip sensor 82. FIG. 10 illustrates a state in which the feeler 81 blocks the optical path of the tooth slip sensor 82. FIG. 11 illustrates a state in which the feeler 81 is displaced away from the optical path of the tooth slip sensor 82. As illustrated in FIGS. 9 to 11, the adjuster 72 includes the feeler 81 and the tooth slip sensor 82.

As illustrated in FIG. 9, the feeler 81 is rotatably supported by the swing shaft 74. The feeler 81 receives the driving force of the swing motor 76, thereby swinging integrally with the swing arm 75. The tooth slip sensor 82 detects that a tooth of the drive gear 70 slips over a tooth of the one of the driven gears 71 during the rotation of the slide motor 69 and then outputs a detection signal to the controller 100.

The tooth slip sensor 82 is, for example, a transmissive optical sensor. In this case, the tooth slip sensor 82 includes: a light emitter that outputs light; and a light receiver that receives the light output from the light emitter. When the light receiver does not receive the light from the light emitter, the tooth slip sensor 82 outputs the detection signal. When the light receiver receives the light from the light emitter, the tooth slip sensor 82 stops outputting the detection signal.

As illustrated in FIG. 10, when the swing arm 75 is disposed at the engaging location, the feeler 81 blocks the optical path between the light emitter and the light receiver. In this case, the tooth slip sensor 82 outputs the detection signal. As illustrated in FIG. 11, when the swing arm 75 is displaced away from the engaging location toward the disengaging location by a distance equal to or more than the height of the teeth of the one of the driven gears 71, the feeler 81 is displaced away from the optical path between the light emitter and the light receiver. In this case, the tooth slip sensor 82 stops outputting the detection signal.

Control Block of Inkjet Recording Apparatus

Next, a control block configuration of the inkjet recording apparatus 1 will be described with reference to FIG. 12. FIG. 12 is a hardware configuration diagram for a control process to be performed by the inkjet recording apparatus 1. As illustrated in FIG. 12, the inkjet recording apparatus 1 includes a central processing unit (CPU) 101, a random access memory (RAM) 102, a read only memory (ROM) 103, a hard disc drive (HDD) 104, and an interface (I/F) 105, all of which are interconnected via a common bus 109.

The CPU 101 is a calculation unit, which controls an entire operation of the inkjet recording apparatus 1. The RAM 102 is a volatile storage medium that allows data to be read and written at high speed. The CPU 101 uses the RAM 102 as a work area for data processing. The ROM 103 is a read-only non-volatile storage medium that stores programs such as firmware. The HDD 104 is a non-volatile storage medium that allows data to be read and written and has a relatively large storage capacity. The HDD 104 stores, for example, an operating system (OS), various control programs, and application programs.

The inkjet recording apparatus 1 processes a control program stored in the ROM 103, an information processing program (application program) loaded from a storage medium such as the HDD 104 into the RAM 102, and other information with an arithmetic function of the CPU 101. Through this process, the inkjet recording apparatus 1 forms a software control unit including various functional modules. Then, the inkjet recording apparatus 1 combines the software control unit formed in this manner with hardware resources mounted in the inkjet recording apparatus 1, thereby constituting a functional block that implements the functions of the inkjet recording apparatus 1. In short, the CPU 101, the RAM 102, the ROM 103, and the HDD 104 constitute a controller 100 as a control unit that controls the operation of the inkjet recording apparatus 1.

The I/F 105 is an interface via which the rotation motor 63, the slide motor 69, the swing motor 76, rotary encoders 63*a*, 69*a*, and 76*a*, the rotation sensor 78, the slide sensor 79, the swing sensor 80, and the tooth slip sensor 82 are coupled to the common bus 109. The controller 100 operates the rotation motor 63, the slide motor 69, and the swing motor 76 via the I/F 105 and acquires detection results from the rotary encoders 63*a*, 69*a*, and 76*a*, the rotation sensor 78, the slide sensor 79, the swing sensor 80, and the tooth slip sensor 82. Although the components of the delivery cylinder 25 (media conveying device) are illustrated in FIG. 12, the controller 100 also controls the loading unit 10, the image forming unit 20, the drying unit 30, and the ejection unit 40.

The rotary encoders 63*a*, 69*a*, and 76*a* output pulse signals indicating the rotation amounts of the rotation motor 63, the slide motor 69, and the swing motor 76, respectively, to the controller 100. More specifically, the controller 100 can count the numbers of pulses in the signals output from the rotary encoders 63*a*, 69*a*, and 76*a*, thereby grasping the rotation amounts of the rotation motor 63, the slide motor 69, and the swing motor 76 (i.e., the rotation amounts of the delivery cylinder 25, the slide amount of the guide discs 66 and 67, and the swing amount of the swing arm 75).

The controller 100 suppresses the rotation of the delivery cylinder 25 (i.e., stops the rotation of the rotation motor 63) and positions the swing arm 75 at the engaging location (i.e., causes the drive gear 70 to engage with the driven gear 71). The controller 100 simultaneously rotates the slide motor 69 in the first direction or the second direction in accordance with the size of the paper sheet P on which the image has been formed by the image forming unit 20. Then, based on the combination of the detection signal output from the rotation sensor 78 and the pulse signal output from the rotary encoder 69*a*, the controller 100 stops the rotation of the slide motor 69 at a timing when the guide discs 66 and 67 face the right margin and the left margin, respectively, of the paper sheet P. In this case, the controller 100 may acquire in advance information regarding the size of the paper sheet P (more specifically, the size in the width direction of the paper sheet P) through an operation panel, for example. Alternatively, the controller 100 may detect the size of the paper sheet P with a sensor.

Figure 13A:
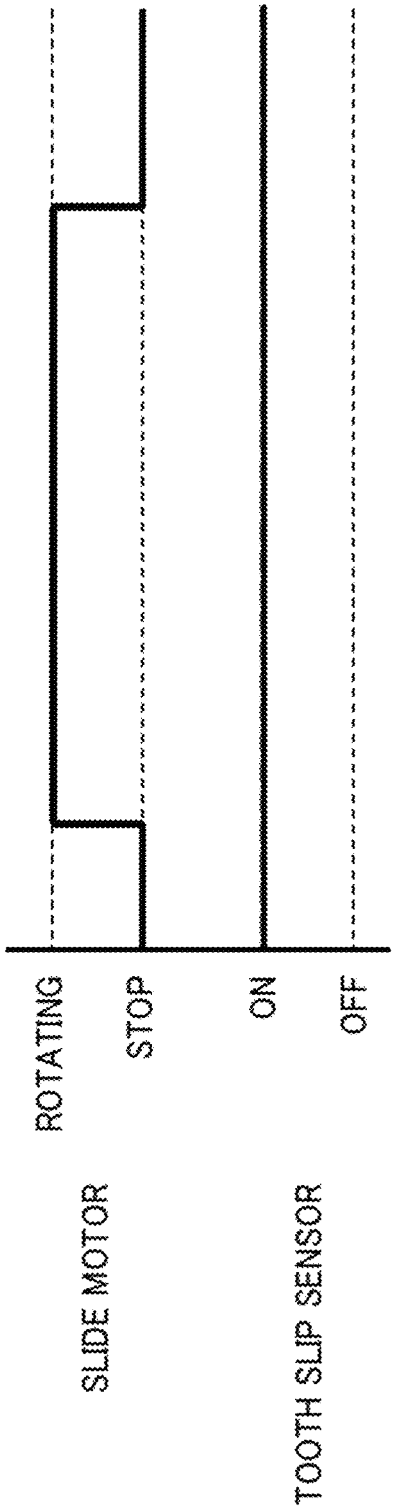
FIG. 13A is a timing chart illustrating a relationship between the rotation of a slide motor and a detection signal of a tooth slip sensor.
Figure 13B:
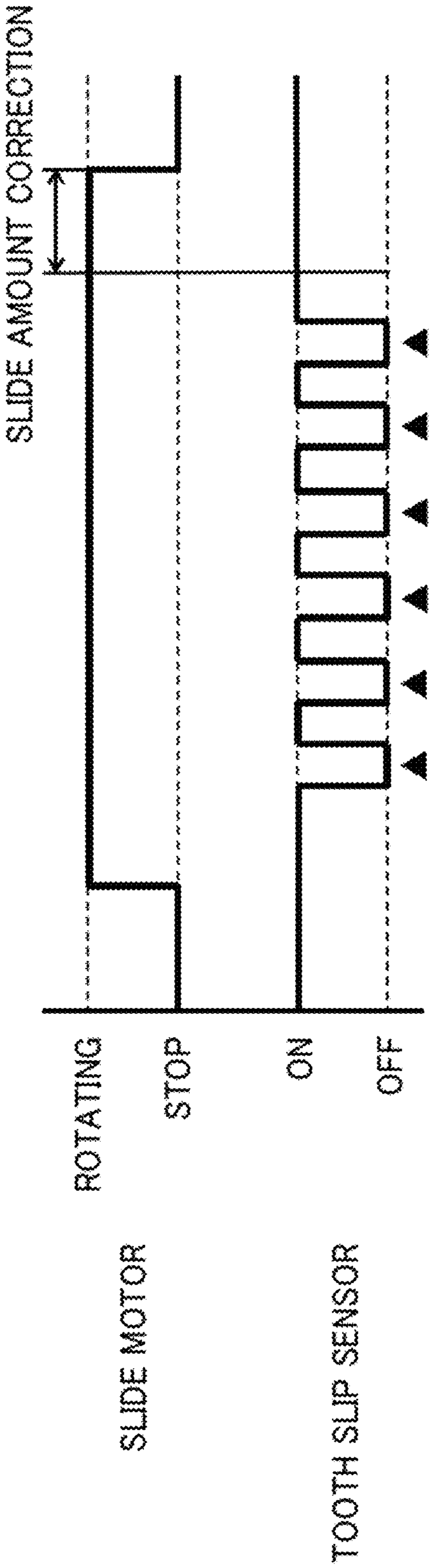
FIG. 13B is another timing chart illustrating the relationship between the rotation of the slide motor and the detection signal of the tooth slip sensor.

FIG. 13A is a timing chart illustrating a relationship between the rotation of the slide motor 69 and the detection signal of the tooth slip sensor 82; FIG. 13B is another timing chart illustrating the relationship between the rotation of the slide motor 69 and the detection signal of the tooth slip sensor 82. As described above, the swing arm 75 is biased toward the engaging location by the coil spring 77. The engagement of the drive gear 70 and the driven gear 71 thus can be maintained during the rotation of the slide motor 69. However, for various circumstances (e.g., dust entered between teeth or wearing of teeth), a tooth of the drive gear 70 may accidentally skip over a tooth of the driven gear 71 (i.e., "tooth slip" may occur). As a result, the driving force of the slide motor 69 may fail to be transmitted to the drive gear 70 and the driven gears 71. In such cases, the slide amount of the guide discs 66 and 67 grasped based on the pulse signal of the rotary encoder 69*a* may differ from an actual one of the guide discs 66 and 67.

As illustrated in FIG. 13A, when the tooth slip does not occur during the rotation of the slide motor 69, the tooth slip sensor 82 continuously outputs the detection signal (or outputs an ON signal). As illustrated in FIG. 13B, when the tooth slip occurs during the rotation of the slide motor 69, the tooth slip sensor 82 alternately outputs and stops outputting the detection signal (or alternately outputs ON and OFF signals). In this case, each zone in which the tooth slip sensor 82 stops outputting the detection signal corresponds to a zone in which a tooth of the drive gear 70 slips over a tooth of the driven gear 71. In the example of FIG. 13B, a tooth of the drive gear 70 slips over six teeth of the driven gear 71. In this case, in response to a zone in which the tooth slip sensor 82 stops outputting the detection signal, the rotary encoder 69*a* is expected to output N (natural number) number of pulse signals.

When the tooth slip occurs during the rotation of the slide motor 69, the controller 100 corrects the slide amounts of the guide discs 66 and 67 in accordance with how many times the tooth slip sensor 82 stops outputting the detection signal. More specifically, in the case of FIG. 13B, the controller 100 further rotates the slide motor 69 by the value obtained by multiplying the number of times (=6) that the tooth slip sensor 82 stops outputting the detection signal by the number of pulse signals per tooth slip (=N).

The controller 100 positions the swing arm 75 at the disengaging location (i.e., positions the drive gear 70 apart from the driven gear 71). The controller 100 simultaneously starts rotating the rotation motor 63 at the timing when the paper sheet P is supplied from the image forming unit 20 (i.e., the leading edge of the paper sheet P reaches the location at which the drum 51 faces the delivery cylinder 25).

As a result of the above, in a state where the guide surface 66*b* of the guide disc 66 and the guide surface 67*b* of the guide disc 67 are kept in contact with the peripheral areas (i.e., the margins) on the paper sheet P in the width direction on the inner circumferential surface side of the curved conveyance path, the controller 100 rotates the delivery cylinder 25 and the guide discs 66 and 67 integrally with one another. The controller 100 then conveys the paper sheet P at a predetermined conveyance speed, based on the pulse signal output from the rotary encoder 63*a*. In addition, the controller 100 stops the rotation of the rotation motor 63 at the timing when the rotation sensor 78 outputs the detection signal (i.e., the guide discs 66 and 67 turn one rotation and are returned to the respective initial locations).

According to the above-described embodiments of the present disclosure, for example, the following operational effects can be obtained.

According to the above embodiment, the inkjet recording apparatus 1 rotates the delivery cylinder 25 and the guide discs 66 and 67 in the state where the guide surfaces 66*b* and 67*b* are kept in contact with the margins of the paper sheet P. In this way, the inkjet recording apparatus 1 can appropriately convey the paper sheet P without bringing the delivery cylinder 25 into contact with the image forming region of the paper sheet P. Furthermore, the inkjet recording apparatus 1 can bring the guide discs 66 and 67 into contact with the inner circumferential surface of the paper sheet P along the curved conveyance path, thereby suppressing skew of and damage to the paper sheet P as compared with a case where the paper sheet P is nipped and conveyed.

According to the above embodiment, in the inkjet recording apparatus 1, the guide discs 66 and 67 are screwed into the first section 65*a* and the second section 65*b*, respectively, which have respective male screws formed in the opposite thread directions. In this way, the inkjet recording apparatus 1 can slide both the guide discs 66 and 67 in relation to each other with the driving force of a single slide motor 69. This configuration can contribute to a simple slide mechanism 64.

According to the above embodiment, the inkjet recording apparatus 1 biases the swing arm 75 toward the engaging location, thereby suppressing an occurrence of the tooth slip during the rotation of the slide motor 69. In this way, the inkjet recording apparatus 1 can slide both the guide discs 66 and 67 so as to face the margins of the paper sheet P.

According to the above embodiment, the inkjet recording apparatus 1 is provided with the tooth slip sensor 82, with which, even if the tooth slip occurs, the sliding amount of the guide discs 66 and 67 can be corrected. In this way, the inkjet recording apparatus 1 can slide both the guide discs 66 and 67 so as to face the margins of the paper sheet P. In this case, when not receiving the detection signal from the tooth slip sensor 82, the controller 100 may stop the rotation of the slide motor 69 and inform an occurrence of an error, instead of correcting the slide amount.

The above control method may be implemented by, for example, a program. In other words, the control method may be executed by causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Embodiments of the present disclosure are not limited to the above-described embodiments and modifications, and numerous additional modifications and variations are possible in light of the teachings. The technical contents included in the technical ideas described in the appended claims are included within the technical scope of the appended claims. The above-described embodiments and modifications are some examples, and various modifications and variations can be practiced from such examples by those skilled in the art. Such embodiments and variations thereof are included in the scope and gist of the embodiments of the present disclosure and are included in the embodiments described in claims and the equivalent scope thereof.

Aspects of the present disclosure are, for example, as follows.

Aspect 1

According to Aspect 1, a media conveying device includes: a delivery cylinder that rotates on an inner circumferential surface side of a medium conveyed along a curved conveyance path; a first guide disc that rotates integrally with the delivery cylinder on an inner circumferential surface side of the curved conveyance path and that has an arc-shaped guide surface that comes into contact with a first peripheral area of the medium in a width direction of the medium; a second guide disc that rotates integrally with the delivery cylinder on the inner circumferential surface side of the curved conveyance path and that has an arc-shaped guide surface that comes into contact with a second peripheral area of the medium in the width direction of the medium; and a slide mechanism that slides the first guide disc and the second guide disc in the width direction of the medium.

Aspect 2

According to Aspect 2, in the media conveying device of Aspect 1, the slide mechanism includes a screw shaft extending in the width direction of the medium, a slide motor that generates a driving force by which the screw shaft is rotated, a drive gear that rotates with rotation of the slide motor, a driven gear that rotates integrally with the screw shaft, and an adjuster that causes the drive gear to engage with and disengage from the driven gear. The first guide disc and the second guide disc are screwed into a male screw formed in the screw shaft and slide in the width direction of the medium with rotation of the screw shaft. The screw shaft includes a first section and a second section, the first section having a male screw into which the first guide disc is screwed, the second section having a male screw into which the second guide disc is screwed, the male screws of the first section and the second section being formed in opposite thread directions.

Aspect 3

According to Aspect 3, in the media conveying device of Aspect 2, the adjuster includes a swing arm that rotatably supports the drive gear and that swings between a disengaging location at which the drive gear disengages from the driven gear and an engaging location at which the drive gear engages with the driven gear, a swing motor that generates a driving force by which the swing arm is swung, and a biasing member biasing the swing arm toward the engaging location.

Aspect 4

According to Aspect 4, in the media conveying device of Aspect 3, the adjuster further includes: an optical sensor that outputs a detection signal when a light receiver does not receive light output from a light emitter and stops outputting the detection signal when the light receiver receives the light output from the light emitter; and a feeler that blocks an optical path between the light emitter and the light receiver when the swing arm is disposed at the engaging location and is displaced away from the optical path when the swing arm moves from the engaging location toward the disengaging location by a distance equal to or more than a height of a tooth of the driven gear.

Aspect 5

According to Aspect 5, the media conveying device of Aspect 4 further includes a controller that controls sliding of the first guide disc and the second guide disc caused by the slide mechanism. The controller corrects, during rotation of the slide motor, a sliding amount of the first guide disc and the second guide disc in accordance with how many times the optical sensor stops outputting the detection signal.

Aspect 6

According to Aspect 6, the media conveying device according to one of Aspects 2 to 4 further includes: a rotation motor that generates a driving force by which the delivery cylinder, the first guide disc, and the second guide disc are rotated integrally with one another; and a controller that controls the slide motor, the adjuster, and the rotation motor. The controller drives the slide motor in a state where rotation of the delivery cylinder is suppressed and the adjuster keeps engagement of the drive gear with the driven gear and consequently slides the first guide disc and the second guide disc. The controller drives the rotation motor in a state where the adjuster keeps disengagement of the drive gear from the driven gear and consequently rotates the delivery cylinder, the first guide disc, and the second guide disc integrally with one another.

Aspect 7

According to Aspect 7, an image forming apparatus includes: an image forming device that forms an image on a medium; and the media conveying device of one of Aspects 1 to 6 that conveys the medium on which an image has been formed by the image forming unit.

The invention claimed is:

1. A media conveying device, comprising:

a delivery cylinder to rotate on an inner circumferential surface side of a medium conveyed along a curved conveyance path;

a first guide disc to rotate integrally with the delivery cylinder on an inner circumferential surface side of the curved conveyance path, the first guide disc having an arc-shaped guide surface to come into contact with a first peripheral area of the medium in a width direction of the medium;

a second guide disc to rotate integrally with the delivery cylinder on the inner circumferential surface side of the curved conveyance path, the second guide disc having an arc-shaped guide surface to come into contact with a second peripheral area of the medium in the width direction of the medium; and a slide mechanism to slide the first guide disc and the second guide disc in the width direction of the medium.

2. The media conveying device according to claim 1, wherein the slide mechanism includes a screw shaft extending in the width direction of the medium, a slide motor to generate a driving force to rotate the screw shaft, a drive gear to rotate with rotation of the slide motor, a driven gear to rotate integrally with the screw shaft, and an adjuster to cause the drive gear to engage with and disengage from the driven gear, the first guide disc and the second guide disc are screwed into a male screw formed in the screw shaft and slide in the width direction of the medium with rotation of the screw shaft, and the screw shaft includes a first section and a second section, the first section having a male screw into which the first guide disc is screwed, the second section having a male screw into which the second guide disc is screwed, the male screw of the first section and the male screw of the second section being formed in opposite thread directions.

3. The media conveying device according to claim 2, wherein the adjuster includes a swing arm to rotatably support the drive gear and swing between a disengaging location at which the drive gear disengages from the driven gear and an engaging location at which the drive gear engages with the driven gear, a swing motor to generate a driving force to swing the swing arm, and a biasing member biasing the swing arm toward the engaging location.

4. The media conveying device according to claim 3, wherein the adjuster further includes:

an optical sensor to output a detection signal when a light receiver does not receive light output from a light emitter, and stop outputting the detection signal when the light receiver receives the light output from the light emitter; and a feeler to block an optical path between the light emitter and the light receiver when the swing arm is disposed at the engaging location and is displaced away from the optical path when the swing arm moves from the engaging location toward the disengaging location by a distance equal to or more than a height of a tooth of the driven gear.

5. The media conveying device according to claim 4, further comprising a controller to control sliding of the first guide disc and the second guide disc caused by the slide mechanism, wherein the controller corrects, during rotation of the slide motor, a sliding amount of the first guide disc and the second guide disc in accordance with how many times the optical sensor stops outputting the detection signal.

6. The media conveying device according to claim 2, further comprising:

a rotation motor to generate a driving force to rotate the delivery cylinder, the first guide disc, and the second guide disc integrally with one another; and a controller to control the slide motor, the adjuster, and the rotation motor, wherein in a state where rotation of the delivery cylinder is restricted and the adjuster keeps engagement of the drive gear with the driven gear, the controller drives the slide motor to slide the first guide disc and the second guide disc, and in a state where the adjuster keeps disengagement of the drive gear from the driven gear, the controller drives the rotation motor to rotate the delivery cylinder, the first guide disc, and the second guide disc integrally with one another.

7. An image forming apparatus comprising:

an image forming device to form an image on a medium; and the media conveying device according to claim 1 to convey the medium on which the image has been formed by the image forming device.

* * * * *